US008593080B2

(12) United States Patent
Hu et al.

(10) Patent No.: US 8,593,080 B2

(45) Date of Patent: Nov. 26, 2013

(54) IGNITION CONTROL APPARATUS USED IN ELECTRONIC BALLAST AND METHOD THEREOF

(75) Inventors: Jin Hu, Hangzhou (CN); Qing Xu, Hangzhou (CN); Quansong Wu, Hangzhou (CN)

(73) Assignee: Zhejiang Dabong Technology Co., Ltd., Hangzhou (CN)

( * ) Notice: Subject to any disclaimer, the term of this patent is extended or adjusted under 35 U.S.C. 154(b) by 290 days.

(21) Appl. No.: 13/088,251

(22) Filed: Apr. 15, 2011

(65) Prior Publication Data

US 2012/0001565 A1 Jan. 5, 2012

(30) Foreign Application Priority Data

Jun. 30, 2010 (CN) .......................... 2010 1 0218745

(51) Int. Cl.

*G06F 1/00* (2006.01)
*H05B 37/02* (2006.01)
*H05B 39/04* (2006.01)
*H05B 41/36* (2006.01)

(52) U.S. Cl.

USPC ........................................... 315/307; 315/291

(58) Field of Classification Search

USPC .................................................. 315/307, 219
See application file for complete search history.

(56) References Cited

U.S. PATENT DOCUMENTS

| | | | | |
|---|---|---|---|---|
| 5,295,036 | A * | 3/1994 | Yagi et al. | 361/79 |
| 5,604,411 | A * | 2/1997 | Venkitasubrahmanian et al. | 315/307 |
| 5,907,224 | A * | 5/1999 | Yamashita et al. | 315/308 |
| 6,002,215 | A * | 12/1999 | Yamashita et al. | 315/308 |
| 6,153,987 | A * | 11/2000 | Toda et al. | 315/308 |
| 6,788,005 | B2 * | 9/2004 | Chu et al. | 315/219 |
| 2002/0047598 | A1 * | 4/2002 | Van Casteren et al. | 315/209 R |
| 2007/0210723 | A1 * | 9/2007 | Kumagai et al. | 315/209 M |
| 2009/0261756 | A1 * | 10/2009 | Tolle et al. | 315/307 |

* cited by examiner

*Primary Examiner* — Shawki Ismail
*Assistant Examiner* — Dylan White
(74) *Attorney, Agent, or Firm* — Perkins Coie LLP

(57) ABSTRACT

The present invention is generally related to an electronic ballast, an ignition control apparatus used therein and associated method of operation. In one embodiment, an electronic ballast comprising an inverter and an ignition control apparatus which comprises a stability monitoring circuit and a controlled ignition circuit. The inverter converts a DC input voltage into an AC voltage to drive a gas discharge lamp. The stability monitoring circuit monitors whether the DC input voltage is stable. The controlled ignition circuit is electrically coupled to the stability monitoring circuit and the lamp, ignites the lamp based on the monitoring result. The controlled ignition circuit does not ignite the gas discharge lamp until the DC input voltage becomes stable.

10 Claims, 7 Drawing Sheets

IGNITION CONTROL APPARATUS USED IN ELECTRONIC BALLAST AND METHOD THEREOF

CROSS-REFERENCE TO RELATED APPLICATIONS

This application claims the benefit of priority of Chinese Patent Application No. 201010218745.7 filed on Jun. 30, 2010, the disclosure of which is incorporated herein in its entirety by reference.

TECHNICAL FIELD

The present invention generally relates to electrical circuits, and more particularly, relates to an electronic ballast, an ignition control apparatus used therein and method thereof.

BACKGROUND

Generally, an electronic ballast is used to provide an AC (alternating current) voltage to drive gas discharge lamps, such as fluorescent lamp, high pressure sodium lamp and metal halid lamp. An input voltage is derived from an AC power supply or battery and converted into a DC (direct current) input voltage. The DC input voltage is then converted into an AC driving voltage by an inverter.

Different driving voltages are needed during different operating phases. A driving voltage, which may be variable from hundreds to ten thousands of volts based on the characteristics and application of the lamp, is needed during ignition. However, after the lamp being ignited and entering into the steady state, the operating voltage across it is much lower, such as 200 volts.

Two igniting methods are commonly used. One is resonance igniting method, wherein the ignition voltage is generated by a resonance circuit with frequency sweeping. The other is pulse igniting method, wherein a high voltage pulse signal is generated by a switch and a coupled inductor to ignite the lamp. If the ignition fails, the ballast may stop working or try to ignite the lamp again after a certain time period.

FIG. 1 is a block diagram of a prior ballast using pulse igniting method. It comprises a voltage converter 101, an inverter 102, a pulse generator 103, an inductor L, a coupled inductor $L_{couple}$ and a switch $S_{strike}$. The voltage converter 101 receives an input voltage $V_{in}$ from an AC power supply or battery and converts it into a DC input voltage $V_{dc}$. The voltage converter 101 may comprise a rectifier bridge, a DC/DC converter or an AC/DC converter. The inverter 102 is electrically coupled to the voltage converter 101, receives the DC input voltage $V_{dc}$ and generates an AC driving voltage $V_{out}$ across the lamp through the inductor L. The inverter 102 may utilize any DC/AC topology, such as full bridge, half bridge and so on. The coupled inductor $L_{couple}$ is magnetically coupled to the inductor L. One terminal of the coupled inductor $L_{couple}$ is electrically coupled to receive the DC input voltage $V_{dc}$. The switch $S_{strike}$ is electrically coupled between another terminal of the coupled inductor $L_{couple}$ and the ground. The pulse generator 103 is electrically coupled to the gate of the switch $S_{strike}$, generates an ignition pulse when the ballast is started up. The switch $S_{strike}$ is turned on for a time period and then turned off by the ignition pulse, so a high voltage is generated across the inductor L. This voltage is applied across the lamp to ignite it.

FIG. 2 is a block diagram of a prior ballast using resonance igniting method. It comprises a voltage converter 201, an inverter 202, a frequency sweeping circuit 204, an inductor L, capacitors $C_s$ and $C_p$. The voltage converter 201 and inverter 202 are similar to the corresponding circuits in FIG. 1. The capacitor $C_s$ is serially coupled to the inductor L. The capacitor $C_p$ is electrically coupled to the lamp in parallel. A resonance circuit is formed by the capacitors $C_s$, $C_p$ and the inductor L. The inverter 202 comprises at least one switch. The frequency sweeping circuit 204 is electrically coupled to the inverter 202. When the ballast is started up, the switching frequency of the inverter 202 is reduced by the frequency sweeping circuit 204 from a value which is larger the resonance frequency of the resonance circuit. So a high voltage is generated across the lamp to ignite it.

In the igniting methods mentioned above, the ignition voltage is directly related to the DC input voltage $V_{dc}$. The larger the DC input voltage $V_{dc}$, the larger the ignition voltage. When the ballast is just started up, the DC input voltage $V_{dc}$ is unstable. It may be much larger or smaller than the predetermined value, which will cause the ignition voltage to be too high or too low. The ballast and lamp will be destroyed if the ignition voltage is too high. The lamp won't be timely ignited if the ignition voltage is too low.

SUMMARY

It is therefore an object of the present invention to provide an electronic ballast, an ignition control apparatus used therein and method thereof, which can provide stable ignition voltage so that the lamp can be timely ignited and the lamp can be protected to avoid being destroyed.

According to one embodiment of the present invention, an ignition control apparatus used in a ballast is provided. The ballast comprises an inverter which converts a DC input voltage into an AC voltage to drive a gas discharge lamp, the ignition control apparatus comprising: a stability monitoring circuit, monitoring whether the DC input voltage is stable; and a controlled ignition circuit, electrically coupled to the stability monitoring circuit, igniting the lamp based on the monitoring result; wherein the controlled ignition circuit does not ignite the lamp until the DC input voltage becomes stable.

The stability monitoring circuit may comprise a voltage sensing circuit, electrically coupled to the input terminals of the inverter, sensing the DC input voltage and generating a voltage sensing signal representative of it; and a voltage comparison circuit, electrically coupled to the voltage sensing circuit, comparing the voltage sensing signal with a first threshold and a second threshold; wherein the first threshold is smaller than the second threshold. If the voltage sensing signal is larger than the first threshold and smaller than the second threshold, the DC input voltage is deemed as stable.

The stability monitoring circuit may comprise a timer which starts timing once the ballast is started up, the stability monitoring circuit monitors whether the DC input voltage is stable based on the time value. If the time value is longer than a time threshold, the DC input voltage is deemed as stable.

The controlled ignition circuit may comprise an inductor, electrically coupled between the output terminals of the inverter and the lamp; a coupled inductor, magnetically coupled to the inductor; an ignition switch, electrically coupled between the coupled inductor and the ground; and a pulse generator, electrically coupled between the stability monitoring circuit and the gate of the ignition switch, controlling the on and off of the ignition switch based on the monitoring result; wherein the pulse generator does not generate an ignition pulse until the DC input voltage becomes stable.

The inverter may comprise at least one switch, the controlled ignition circuit may comprise a resonance circuit, electrically coupled between the output terminals of the inverter and the gas discharge lamp; and a frequency sweeping circuit, electrically coupled to the gate of the at least one switch, reducing the switching frequency of the at least one switch based on the monitoring result; wherein the frequency sweeping circuit does not reduce the switching frequency until the DC input voltage becomes stable.

According to another embodiment of the present invention, a ballast is provided, which comprises an inverter, converting a DC input voltage into an AC voltage to drive a gas discharge lamp; a stability monitoring circuit, monitoring whether the DC input voltage is stable; and a controlled ignition circuit, electrically coupled to the stability monitoring circuit, igniting the lamp based on the monitoring result; wherein the controlled ignition circuit does not ignite the lamp until the DC input voltage becomes stable.

According to another embodiment of the present invention, an igniting method used in a ballast is provided. The ballast comprises an inverter which converts a DC input voltage into an AC voltage to drive a gas discharge lamp. The method comprises starting up the ballast; monitoring whether the DC input voltage is stable; and starting to ignite the lamp once the DC input voltage becomes stable.

BRIEF DESCRIPTION OF THE DRAWINGS

Exemplary embodiments of the present invention will be more clearly understood from the following detailed description taken in conjunction with the accompanying drawings in which.

Like reference symbols and designations in the various drawings indicate like elements.

DETAILED DESCRIPTION

Several embodiments of the present invention are described below with reference to an electronic ballast, an ignition control apparatus used therein and associated method of operation. Many specific details of certain embodiments are set forth in the following text to provide a thorough understanding of these embodiments. For example, in particular embodiments, the present invention is directed to an electronic ballast comprising an inverter and an ignition control apparatus. The ignition control apparatus comprises a stability monitoring circuit and a controlled ignition circuit. The inverter converts a DC input voltage into an AC voltage to drive a gas discharge lamp. The stability monitoring circuit monitors whether the DC input voltage is stable. The controlled ignition circuit is electrically coupled to the stability monitoring circuit and the lamp, ignites the lamp based on the monitoring result. The controlled ignition circuit does not ignite the gas discharge lamp until the DC input voltage becomes stable. Several other embodiments of the present invention can have configurations, components, and/or processes different from those described below. A person skilled in the relevant art, therefore, will appreciate that additional embodiments may be practiced without several of the details of the embodiments shown in FIGS. 3-7.

Figure 1:
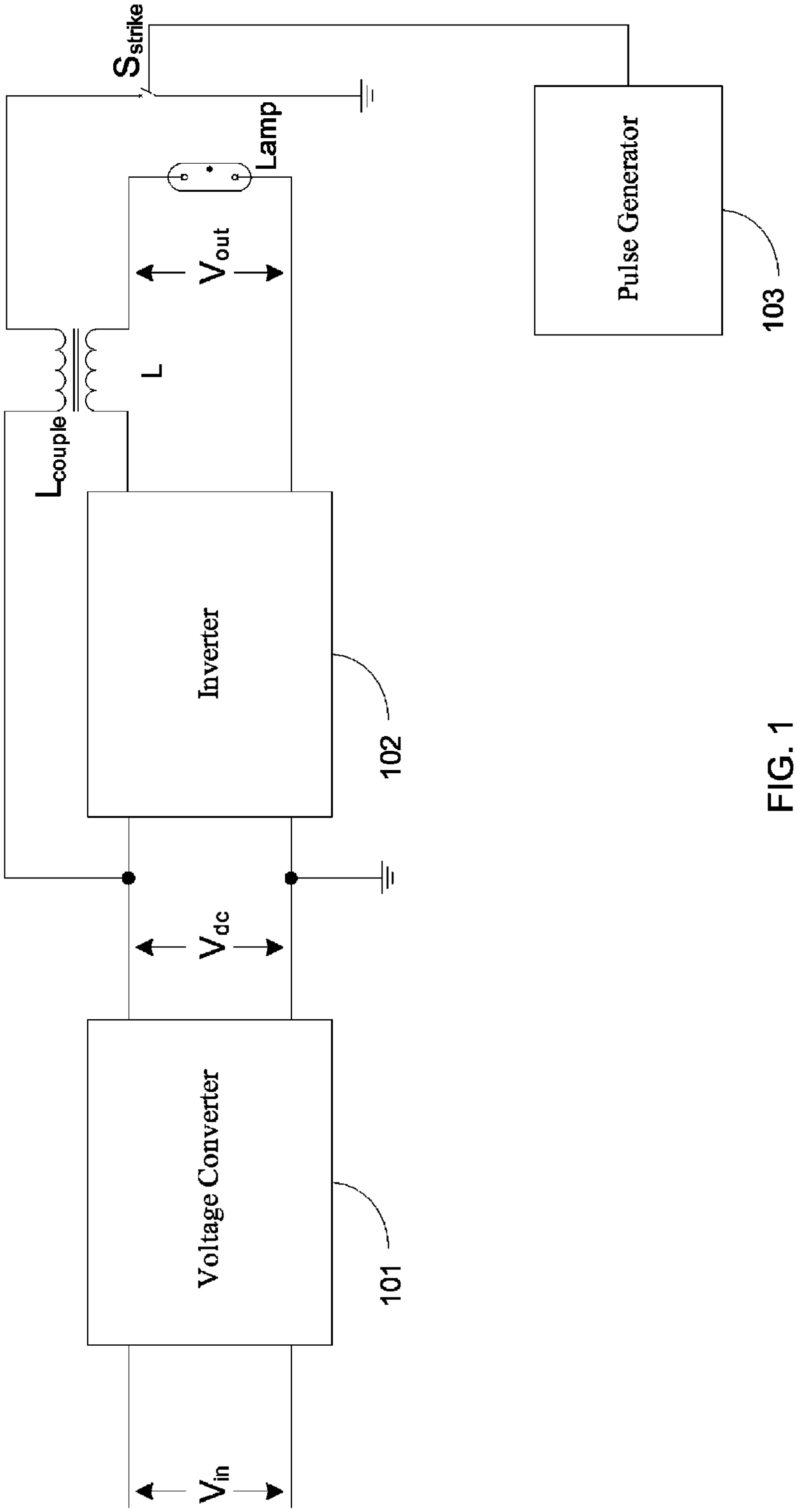
FIG. 1 is a block diagram of a prior ballast using pulse igniting method.
Figure 2:
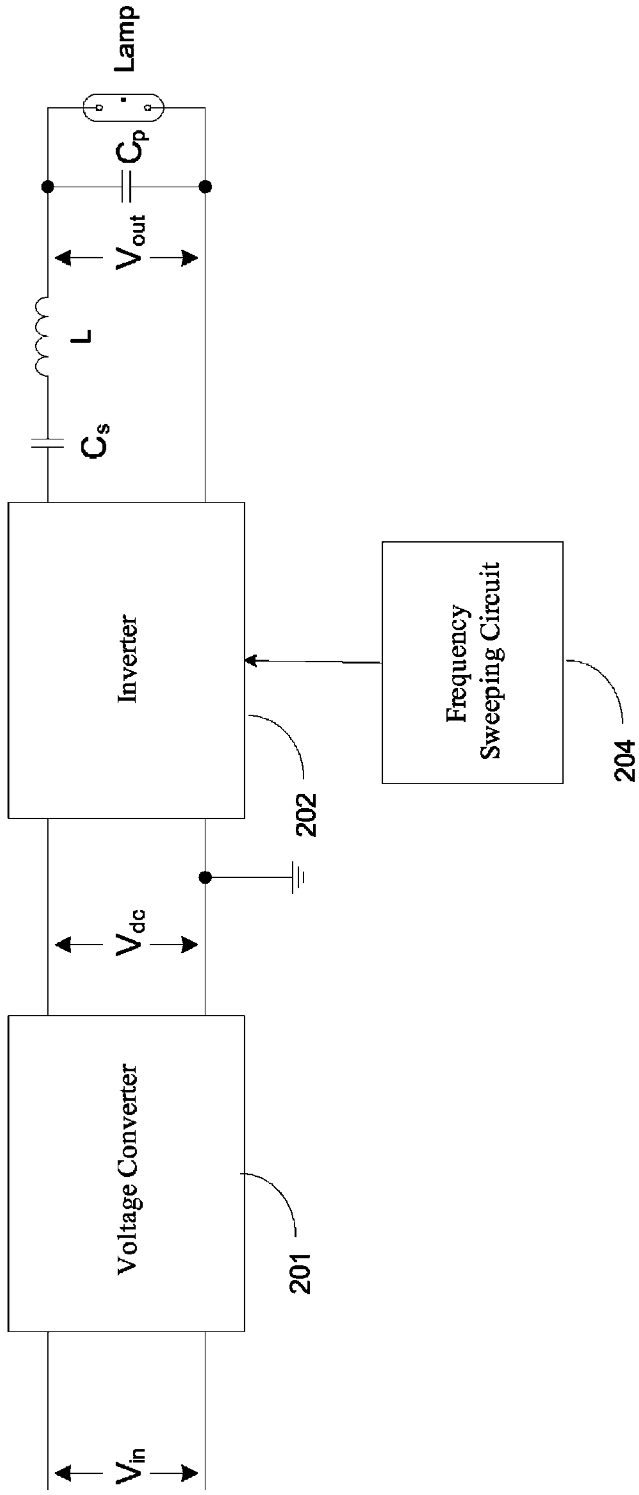
FIG. 2 is a block diagram of a prior ballast using resonance igniting method.
Figure 3:
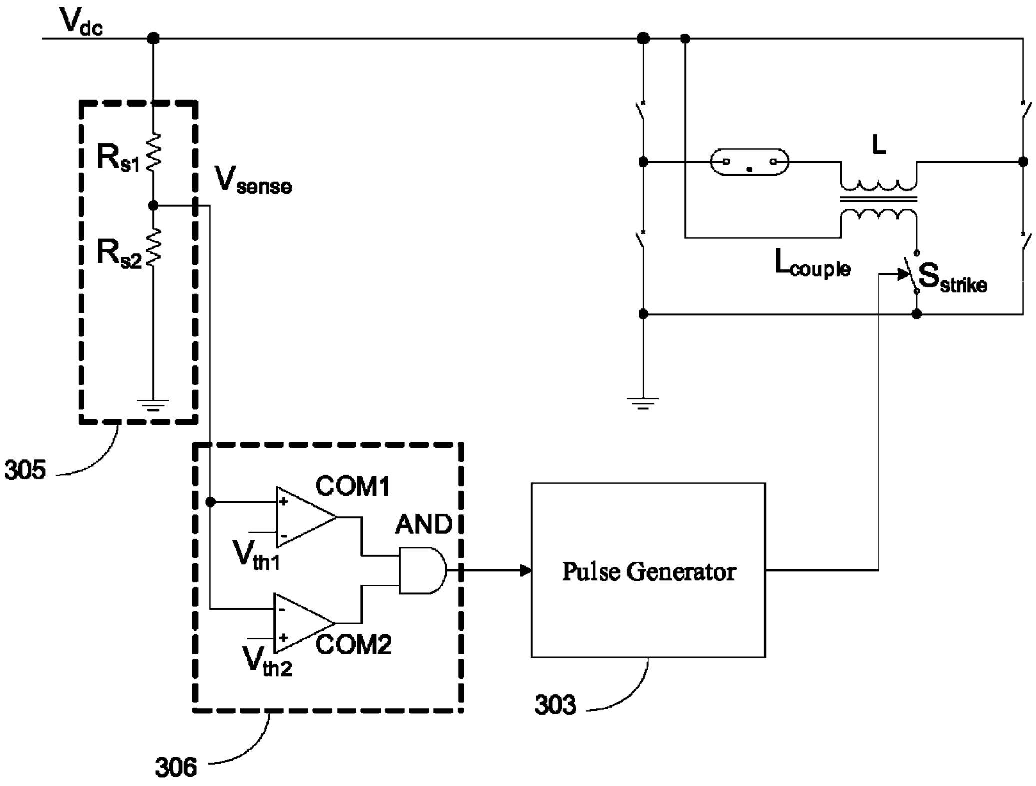
FIG. 3 is a schematic circuit diagram illustrating a ballast in accordance with one embodiment of the present invention.

FIG. 3 is a schematic circuit diagram illustrating a ballast in accordance with one embodiment of the present invention. The full bridge topology is used in the inverter, and the pulse igniting method is used in the controlled ignition apparatus. The stability monitoring circuit monitors whether the DC input voltage is stable based on its value. If the value of the DC input voltage $V_{dc}$ is within a predetermined scope, which means it is within a normal operation scope, the DC input voltage $V_{dc}$ is deemed as stable.

The stability monitoring circuit comprises a voltage sensing circuit 305 and a voltage comparison circuit 306. The voltage sensing circuit 305 is electrically coupled to the input terminals of the inverter, senses the DC input voltage $V_{dc}$ and generates a voltage sensing signal $V_{sense}$ representative of it. In one embodiment, the voltage sensing circuit 305 is a resistor divider comprising resistors $Rs_1$ and $Rs_2$. The voltage comparison circuit 306 is electrically coupled to the voltage sensing circuit 305, receives the voltage sensing signal $V_{sense}$ and compares it with thresholds $V_{th1}$ and $V_{th2}$, wherein $V_{th1}$ is smaller than $V_{th2}$. If the voltage sensing signal $V_{sense}$ is larger than the threshold $V_{th1}$ and smaller than the threshold $V_{th2}$, the DC input voltage $V_{dc}$ is deemed as stable and the controlled ignition circuit is triggered. The value of the thresholds $V_{th1}$ and $V_{th2}$ is determined by the voltage sensing ratio and the rated ignition voltage of the lamp. In one embodiment, the voltage comparison circuit 306 comprises comparators COM1, COM2 and a gate circuit AND, connected as shown in FIG. 3. The controlled ignition circuit is triggered once the output signal of the gate circuit AND becomes high level.

The controlled ignition circuit comprises a pulse generator 303, an inductor L, a coupled inductor $L_{couple}$ and a switch $S_{strike}$. The inductor L is serially coupled between the output terminals of the inverter and the lamp. The coupled inductor $L_{couple}$ is magnetically coupled to the inductor L. One terminal of the coupled inductor $L_{couple}$ is electrically coupled to receive the DC input voltage Vdc. The switch $S_{strike}$ is electrically coupled between another terminal of the coupled inductor $L_{couple}$ and the ground. The pulse generator 303 is electrically coupled between the stability monitoring circuit and the gate of the switch $S_{strike}$, controls the on and off of the switch $S_{strike}$ based on the monitoring result. The pulse generator 303 does not generate the ignition pulse until the DC input voltage becomes stable.

Figure 4:
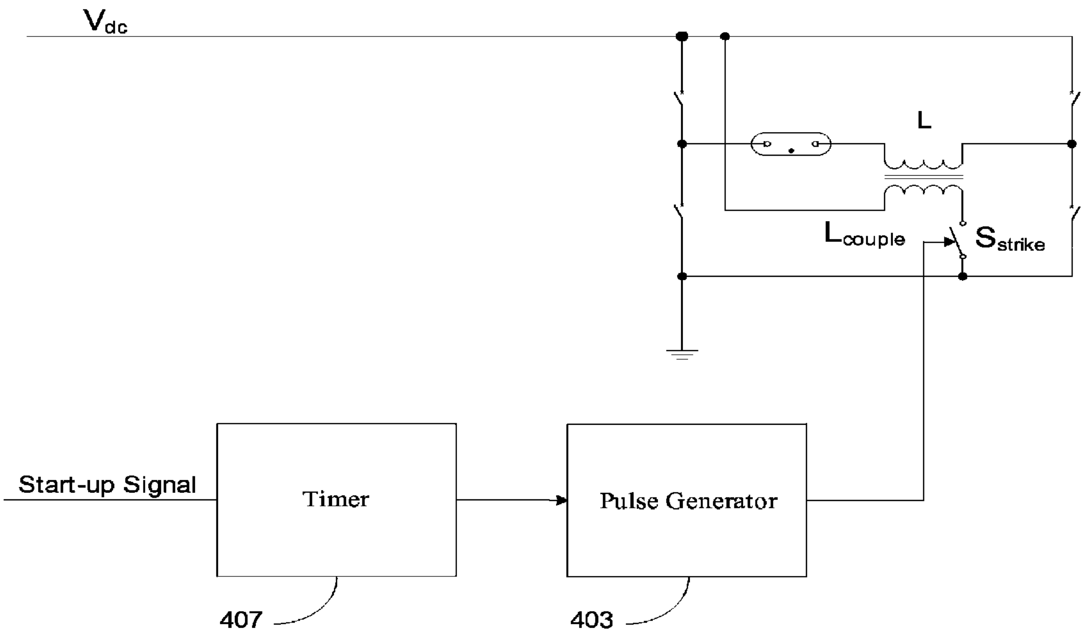
FIG. 4 is a schematic circuit diagram illustrating a ballast in accordance with another embodiment of the present invention.

FIG. 4 is a schematic circuit diagram illustrating a ballast in accordance with another embodiment of the present invention. The full bridge topology is used in the inverter, and the pulse igniting method is used in the controlled ignition apparatus. The stability monitoring circuit comprises a timer 407, which starts timing once the ballast is started up. The stability monitoring circuit monitors whether the DC input voltage $V_{dc}$ is stable based on the time value.

The timer 407 receives a start up signal of the ballast and starts timing once the ballast is started up. The time value is compared with a time threshold $T_{th}$. The DC input voltage $V_{dc}$ is deemed as stable if the time value is longer than the time threshold $T_{th}$. The value of the time threshold $T_{th}$ is experiential, such as hundreds of millisecond. The timer 407 may be realized by a digital pulse counter, or a capacitor charge circuit.

Figure 5:
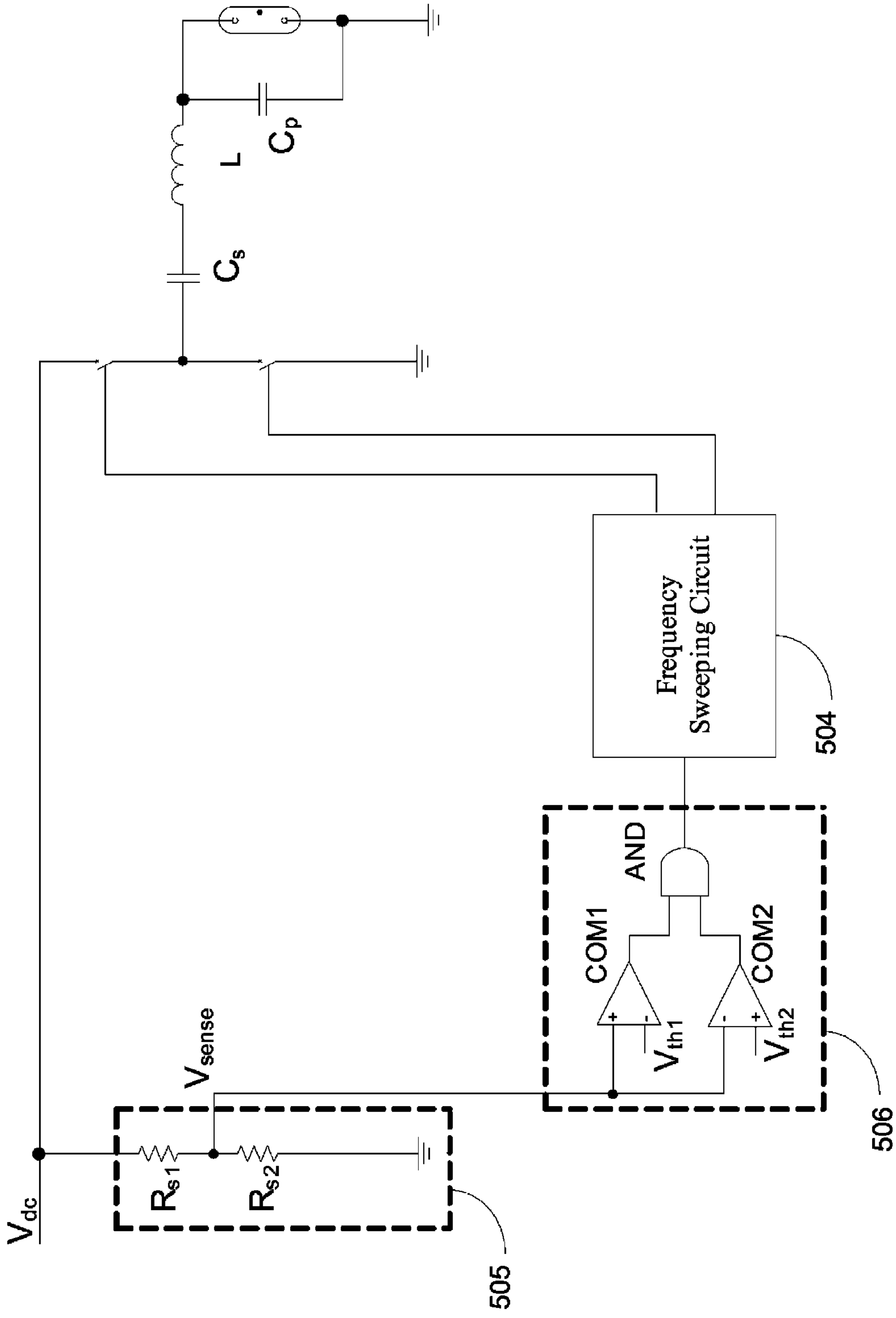
FIG. 5 is a schematic circuit diagram illustrating a ballast in accordance with still another embodiment of the present invention.

FIG. 5 is a schematic circuit diagram illustrating a ballast in accordance with still another embodiment of the present invention. The half bridge topology is used in the inverter, and the resonance igniting method is used in the controlled ignition apparatus. The stability monitoring circuit monitors whether the DC input voltage $V_{dc}$ is stable based on its value. If the value of the DC input voltage $V_{dc}$ is within a predetermined scope, the DC input voltage $V_{dc}$ is deemed as stable.

The inverter comprises two serially connected switches. The controlled ignition circuit comprises a frequency sweeping circuit 504 and a resonance circuit comprising an inductor L, capacitors Cs and Cp. The resonance circuit is electrically coupled between the output terminals of the inverter and the lamp. The frequency sweeping circuit 504 is electrically coupled to the gate of the switches in the inverter.

The frequency sweeping circuit 504 does not reduce the switching frequency until the DC input voltage $V_{dc}$ becomes stable.

Figure 6:
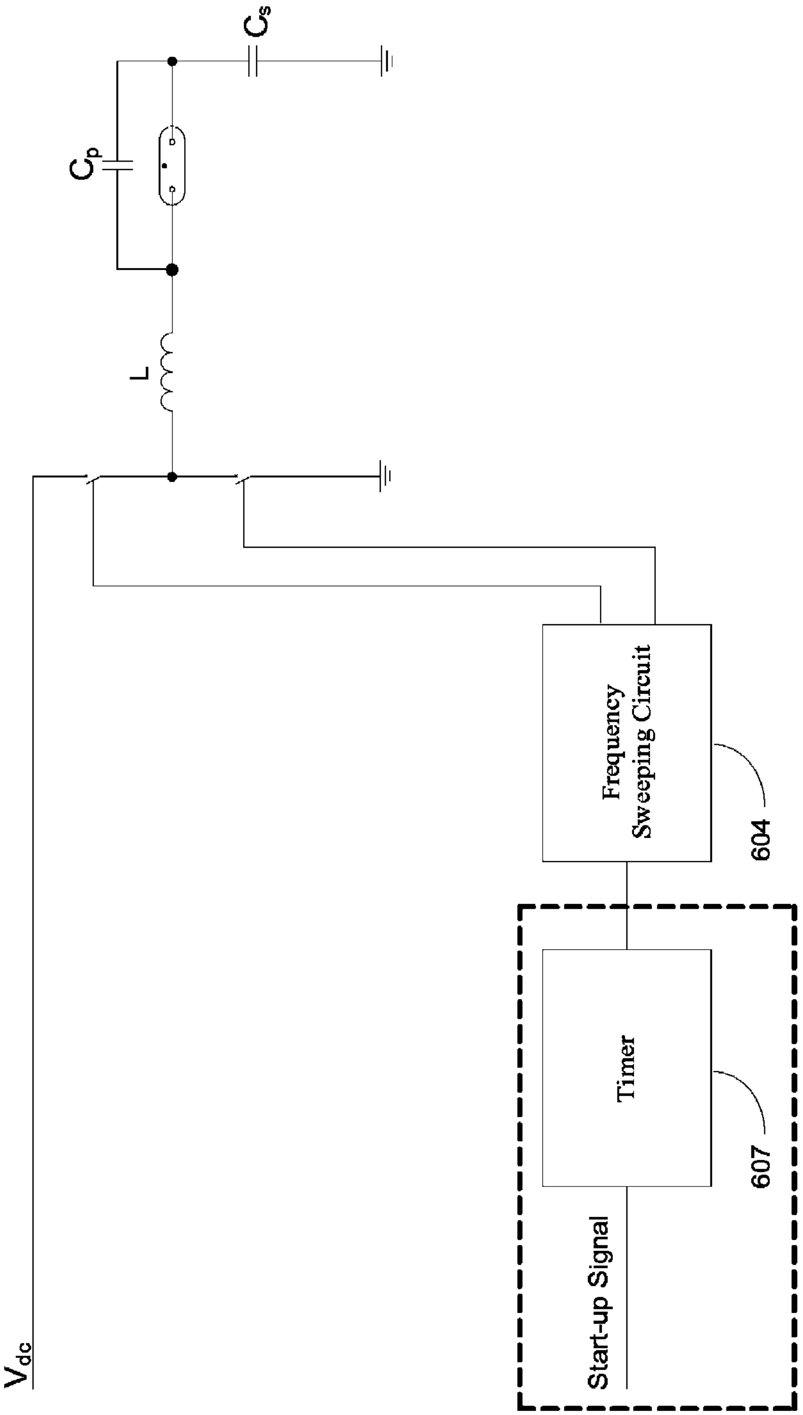
FIG. 6 is a schematic circuit diagram illustrating a ballast in accordance with still another embodiment of the present invention.

FIG. 6 is a schematic circuit diagram illustrating a ballast in accordance with still another embodiment of the present invention. The half bridge topology is used in the inverter, and the resonance igniting method is used in the controlled ignition apparatus. The stability monitoring circuit comprises a timer 607, which starts timing once the ballast is started up. The stability monitoring circuit monitors whether the DC input voltage $V_{dc}$ is stable based on the time value.

Figure 7:
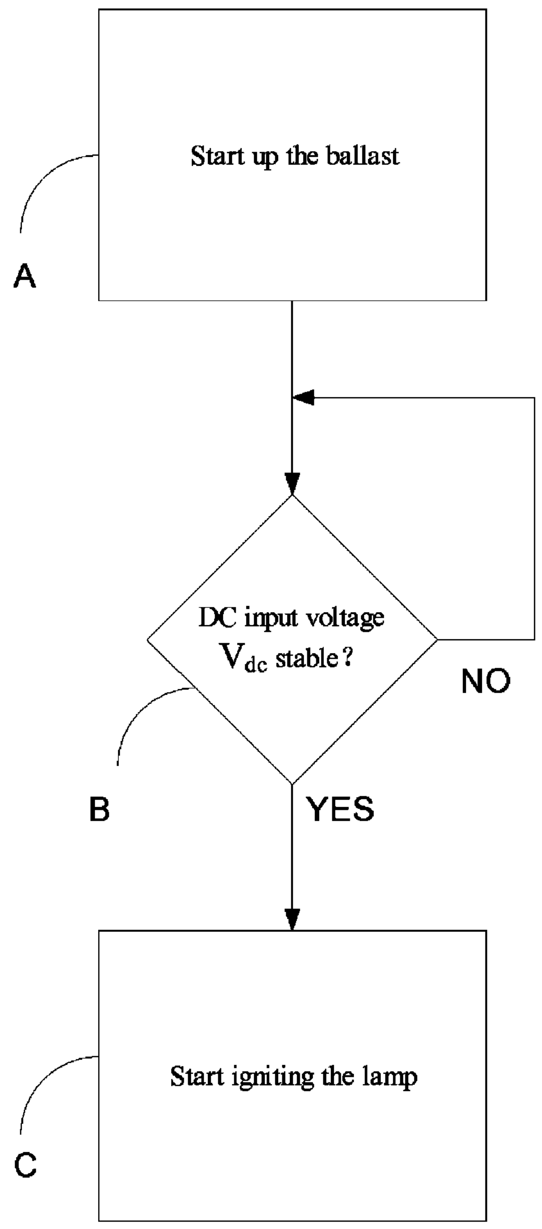
FIG. 7 is a flowchart of an igniting method used in a ballast in accordance with one embodiment of the present invention.

FIG. 7 is a flowchart of an igniting method used in a ballast in accordance with one embodiment of the present invention. The ballast comprises an inverter which converts a DC input voltage $V_{dc}$ into an AC voltage to drive a gas discharge lamp. As shown in FIG. 7, the method comprises operations A~C.

At operation A, the ballast is started up. At operation B, whether the DC input voltage $V_{dc}$ is stable is monitored. If the DC input voltage $V_{dc}$ is stable, go to operation C, else, operation B is repeated. At operation C, the ignition of the lamp is started. The ballast may utilize the resonance igniting method or the pulse igniting method.

In one embodiment, whether the DC input voltage $V_{dc}$ is stable is monitored based on its value. If the value of the DC input voltage $V_{dc}$ is within a predetermined scope, the DC input voltage $V_{dc}$ is deemed as stable. Monitoring whether the DC input voltage is stable may comprises: sensing the DC input voltage $V_{dc}$ and generating a voltage sensing signal $V_{sense}$ representative of it; comparing the voltage sensing signal $V_{sense}$ with thresholds $V_{th1}$ and $V_{th2}$, wherein $V_{th1}$ is smaller than $V_{th2}$. If the voltage sensing signal $V_{sense}$ is larger the threshold Vth1 and smaller than the threshold $V_{th2}$, the DC input voltage $V_{dc}$ is deemed as stable.

In another embodiment, a timer is started once the ballast is started up, and whether the DC input voltage $V_{dc}$ is stable is monitored based on the time value. The time value is compared with a time threshold $T_{th}$. The DC input voltage $V_{dc}$ is deemed as stable if the time value is longer than the time threshold $T_{th}$.

From the foregoing, it will be appreciated that specific embodiments of the invention have been described herein for purposes of illustration, but that various modifications may be made without deviating from the invention. Many of the elements of one embodiment may be combined with other embodiments in addition to or in lieu of the elements of the other embodiments. Accordingly, the invention is not limited except as by the appended claims.

What is claimed is:

1. An ignition control apparatus used in a ballast, the ballast comprises an inverter which converts a DC input voltage into an AC voltage to drive a gas discharge lamp, the ignition control apparatus comprising:

a stability monitoring circuit, monitoring whether the DC input voltage is stable; and a controlled ignition circuit, electrically coupled to the stability monitoring circuit, igniting the lamp based on the monitoring result; wherein the controlled ignition circuit does not ignite the lamp until the DC input voltage becomes stable, and wherein the stability monitoring circuit comprises a timer which starts timing once the ballast is started up, the stability monitoring circuit monitors whether the DC input voltage is stable based on the time value.

2. The ignition control apparatus of claim 1 wherein if the time value is longer than a time threshold, the DC input voltage is deemed as stable.

3. The ignition control apparatus of claim 1 wherein the controlled ignition circuit comprises:

an inductor, electrically coupled between the output terminals of the inverter and the lamp;

a coupled inductor, magnetically coupled to the inductor;

an ignition switch, electrically coupled between the coupled inductor and the ground; and a pulse generator, electrically coupled between the stability monitoring circuit and the gate of the ignition switch, controlling the on and off of the ignition switch based on the monitoring result; wherein the pulse generator does not generate an ignition pulse until the DC input voltage becomes stable.

4. The ignition control apparatus of claim 1 wherein the inverter comprises at least one switch, the controlled ignition circuit comprises:

a resonance circuit, electrically coupled between the output terminals of the inverter and the gas discharge lamp; and a frequency sweeping circuit, electrically coupled to the gate of the at least one switch, reducing the switching frequency of the at least one switch based on the monitoring result; wherein the frequency sweeping circuit does not reduce the switching frequency until the DC input voltage becomes stable.

5. A ballast, comprising:

an inverter, converting a DC input voltage into an AC voltage to drive a gas discharge lamp;

a stability monitoring circuit, monitoring whether the DC input voltage is stable; and a controlled ignition circuit, electrically coupled to the stability monitoring circuit, igniting the lamp based on the monitoring result; wherein the controlled ignition circuit does not ignite the lamp until the DC input voltage becomes stable, and wherein the stability monitoring circuit comprises a timer which starts timing once the ballast is started up, the stability monitoring circuit monitors whether the DC input voltage is stable based on the time value.

6. The ballast of claim 5 wherein if the time value is longer than a time threshold, the DC input voltage is deemed as stable.

7. The ballast of claim 5 wherein the controlled ignition circuit comprises:

an inductor, electrically coupled between the output terminals of the inverter and the lamp;

a coupled inductor, magnetically coupled to the inductor;

an ignition switch, electrically coupled between the coupled inductor and the ground; and a pulse generator, electrically coupled between the stability monitoring circuit and the gate of the ignition switch, controlling the on and off of the ignition switch based on the monitoring result; wherein the pulse generator does not generate an ignition pulse until the DC input voltage becomes stable.

8. The ballast of claim 5 wherein the inverter comprises at least one switch, the controlled ignition circuit comprises:

a resonance circuit, electrically coupled between the output terminals of the inverter and the gas discharge lamp; and a frequency sweeping circuit, electrically coupled to the gate of the at least one switch, reducing the switching frequency of the at least one switch based on the monitoring result; wherein the frequency sweeping circuit does not reduce the switching frequency until the DC input voltage becomes stable.

9. An igniting method used in a ballast, the ballast comprises an inverter which converts a DC input voltage into an AC voltage to drive a gas discharge lamp, the method comprising:

starting up the ballast;

monitoring whether the DC input voltage is stable; and starting to ignite the lamp once the DC input voltage becomes stable;

wherein monitoring whether the DC input voltage is stable comprises:

starting to time once the ballast is started up; and comparing the time value with a time threshold; wherein if the time value is larger than the time threshold, the DC input voltage is deemed as stable.

10. The igniting method of claim 9, further comprising:

operating the gas discharge lamp to reduce a switching frequency after the DC input voltage becomes stable.

* * * * *

UNITED STATES PATENT AND TRADEMARK OFFICE

CERTIFICATE OF CORRECTION

PATENT NO. : 8,593,080 B2
APPLICATION NO. : 13/088251
DATED : November 26, 2013
INVENTOR(S) : Hu et al.

It is certified that error appears in the above-identified patent and that said Letters Patent is hereby corrected as shown below:

In Column 1, line 24, please delete “halid” and insert -- halide --.

Signed and Sealed this
Third Day of May, 2016

Michelle K. Lee
*Director of the United States Patent and Trademark Office*